United States Patent [19]

Shinjo et al.

[11] Patent Number: 4,561,690

[45] Date of Patent: Dec. 31, 1985

[54] BODY STRUCTURE OF AUTOMOTIVE VEHICLE HAVING FRONT SWINGING DOOR AND REAR SLIDING DOOR AND HAVING NO PILLAR BETWEEN FRONT AND REAR DOORS

[75] Inventors: Tuneo Shinjo, Machida; Yoshiharu Nakamura, Atsugi; Takayo Chikaraishi, Kawasaki, all of Japan

[73] Assignee: Nissan Motor Company, Limited, Yokohama, Japan

[21] Appl. No.: 524,581

[22] Filed: Aug. 19, 1983

[30] Foreign Application Priority Data

Aug. 23, 1982 [JP] Japan ................. 57-145857

[51] Int. Cl.$^4$ ............................. B60J 5/06
[52] U.S. Cl. ..................... 296/155; 49/217; 292/36; 292/48; 292/336
[58] Field of Search ............ 296/146, 155, 204, 185; 292/48, 336, 36; 49/214–217, 213, 223, 225, 221, 411

[56] References Cited

U.S. PATENT DOCUMENTS

| | | | |
|---|---|---|---|
| 3,011,209 | 12/1961 | Majeske | 16/105 |
| 3,137,518 | 6/1964 | Dale | 292/36 |
| 3,171,669 | 3/1965 | Barenyi | 280/106 |
| 3,697,124 | 10/1972 | Wessells | 296/185 |
| 3,728,819 | 4/1973 | Goldbach et al. | 49/216 |
| 4,014,587 | 3/1977 | Eggert, Jr. | 296/204 |
| 4,110,934 | 9/1978 | Zens | 49/218 |
| 4,152,872 | 5/1979 | Tanizaki et al. | 49/214 |
| 4,157,846 | 6/1979 | Whitcroft | 296/155 |
| 4,413,444 | 11/1983 | Chikaraishi | 49/409 |

FOREIGN PATENT DOCUMENTS

| | | |
|---|---|---|
| 0045139 | 2/1982 | European Pat. Off. |
| 2854204 | 6/1980 | Fed. Rep. of Germany |
| 56-105079 | 8/1981 | Japan |
| 57-45420 | 3/1982 | Japan |
| 57-41209 | 3/1982 | Japan |
| 57-45419 | 3/1982 | Japan |

*Primary Examiner*—Robert R. Song
*Attorney, Agent, or Firm*—Schwartz, Jeffery, Schwaab, Mack, Blumenthal & Evans

[57] ABSTRACT

A vehicle body structure which can provide a wider passenger compartment than conventional sedan-type vehicles. The vehicle has a substantially flat floor which provides extra space and a single integral door opening on each side. The door opening is closed by a front swinging door and a rear sliding door. The rear sliding door support mechanism is adapted to allow the floor to be positioned lower than in conventional van-type vehicles. The front swinging door has upper and lower door lock mechanisms for locking the front door when closed. The rear sliding door support mechanism includes upper and lower guide rails which are respectively adapted to reinforce a roof side rail and a side sill comprising part of a vehicle framework to provide sufficient resistance to bending stresses applied to the framework, thus allowing a center-pillarless body structure.

10 Claims, 24 Drawing Figures

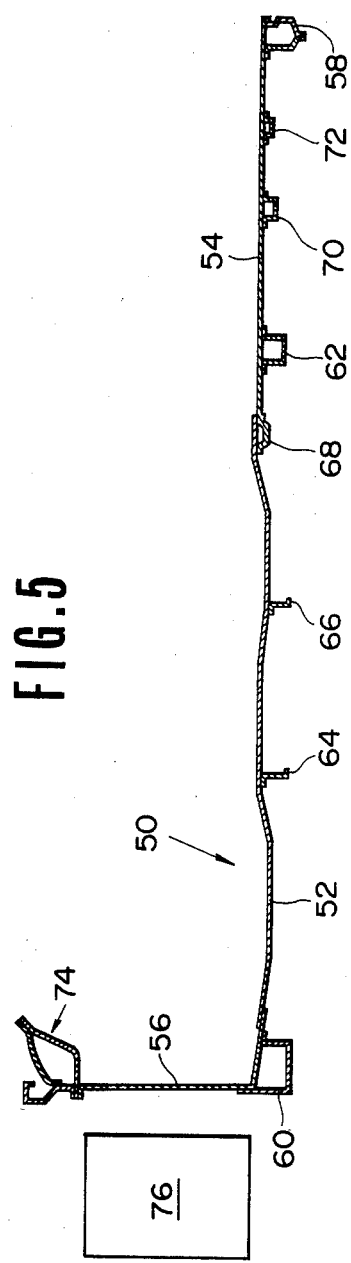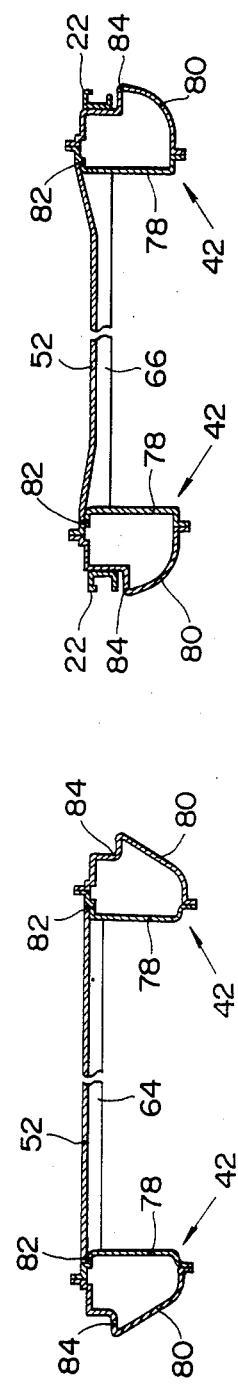

FIG. 9
FIG. 10
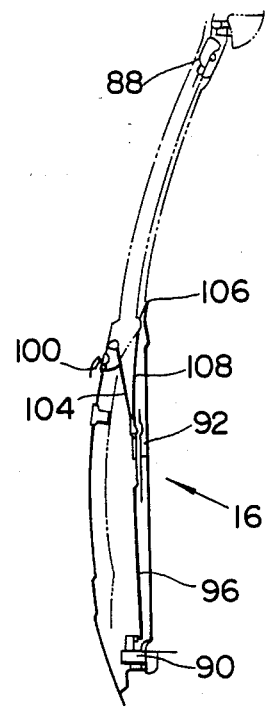
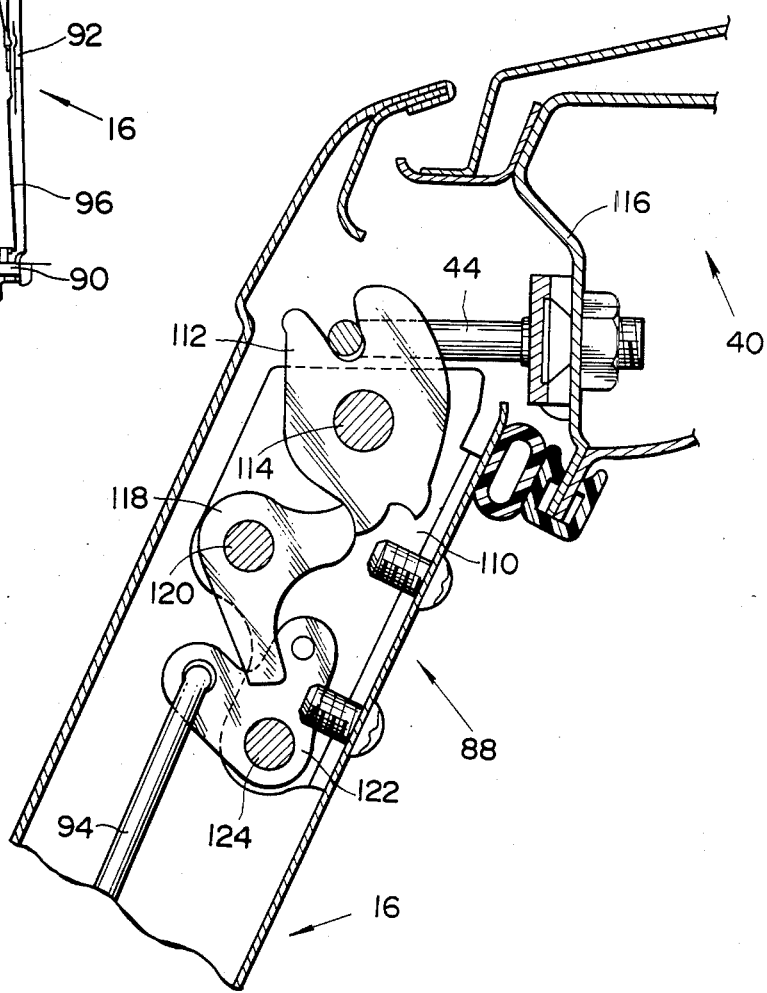

BODY STRUCTURE OF AUTOMOTIVE VEHICLE HAVING FRONT SWINGING DOOR AND REAR SLIDING DOOR AND HAVING NO PILLAR BETWEEN FRONT AND REAR DOORS

BACKGROUND OF THE INVENTION

The present invention relates generally to a vehicle body structure of a sedan-type vehicle which can provide a wider vehicle compartment than conventional sedan-type vehicles. More particularly, the invention relates to a center-pillarless vehicle body structure with a front swinging door and a rear sliding door.

Published Japanese Utility Model application No. 57-45420, published on Mar. 12, 1982 discloses a vehicle having a front and rear doors opposing each other without a pillar therebetween. In this published Japanese Utility Model Application, the swinging door is hinged onto the front edge of a single door opening and the sliding door is adapted to close the rear half of the door opening. The rear sliding door is suspended from guide rails for sliding movement therealong.

The present invention is an improvement of the body structure as illustrated in the foregoing published Japanese Utility Model Application.

SUMMARY OF THE INVENTION

An object of the present invention is to provide a vehicle body structure having a essentially flat floor in the vehicle compartment in order to provide a wider passenger compartment.

Another object of the present invention is to provide a vehicle body structure with no pillar between front and rear doors which close a single door opening on each side of the vehicle.

According to the present invention, a vehicle body structure for providing a wider compartment, includes a floor assembly so constructed as to provide a substantially flat vehicle floor. The flat floor co-operates with a center-pillarless frame, in which front and rear doors are immediately adjacent one another, to make the passenger compartment more comfortable and easier to enter and exit.

In the vehicle body structure of the present invention, the front door is swingingable about a hinge and the rear door is slidable along a vehicle body side portion. Upper and lower door locks are provided for the front swinging door, which are respectively engageable with upper and lower strikers rigidly mounted on upper and lower side frame members in the vehicle frame. On the other hand, the rear sliding door is provided with a door lock engageable with a striker rigidly mounted on a rear pillar.

In one aspect of the present invention, a vehicle body structure comprises a vehicle body defining a single door opening on each side thereof, a floor assembly constituting part of the vehicle body, the floor assembly having a substantially flat upper surface which constitutes a flat vehicle floor, a front swinging door hinged onto the front vertical edge of the door opening and adapted to close the front moiety of the door opening, and a rear sliding door suspended from a guide rail for sliding movement between open and closed positions, the rear sliding door adapted to close the rear moiety of the door opening when in the closed position.

BRIEF DESCRIPTION OF THE DRAWINGS

The present invention will be understood more fully from the following detailed description and from the accompanying drawings of the preferred embodiment of the invention, which, however, should not be taken as limiting the invention but are for illustration and explanation only:

In the drawings:

FIG. 5 shows a longitudinal section of a floor assembly of the vehicle of FIG. 1;

FIG. 6 shows a cross section taken along line VI—VI of FIG. 4;

FIG. 7 shows a cross section taken along line VII—VII of FIG. 4;

FIG. 9 shows a section taken along line IX—IX of FIG. 8;

FIG. 10 is a cross-sectional view of an upper door lock of the front swinging door;

DESCRIPTION OF THE PREFERRED EMBODIMENT

Figure 1:
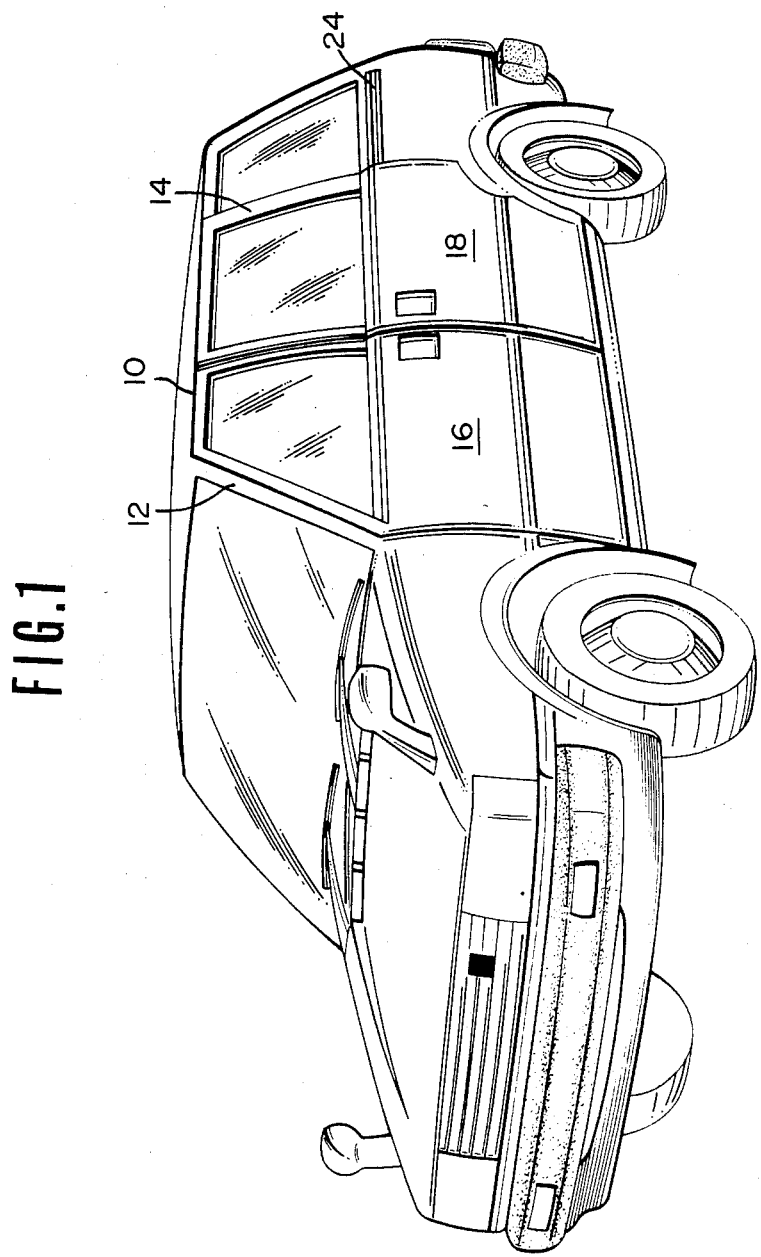
FIG. 1 is a perspective view of an automotive vehicle having the preferred embodiment of a body structure according to the present invention.
Figure 2:
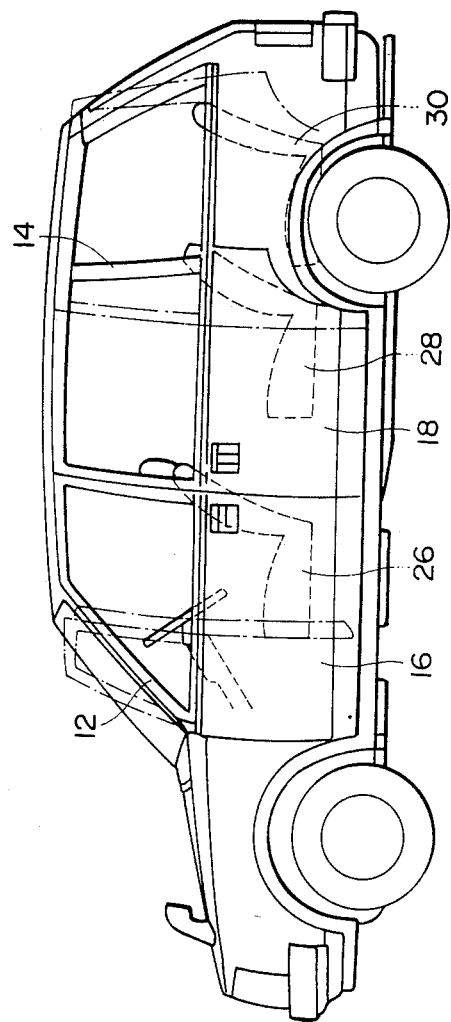
FIG. 2 is a side elevation of the vehicle of FIG. 1.
Figure 3:
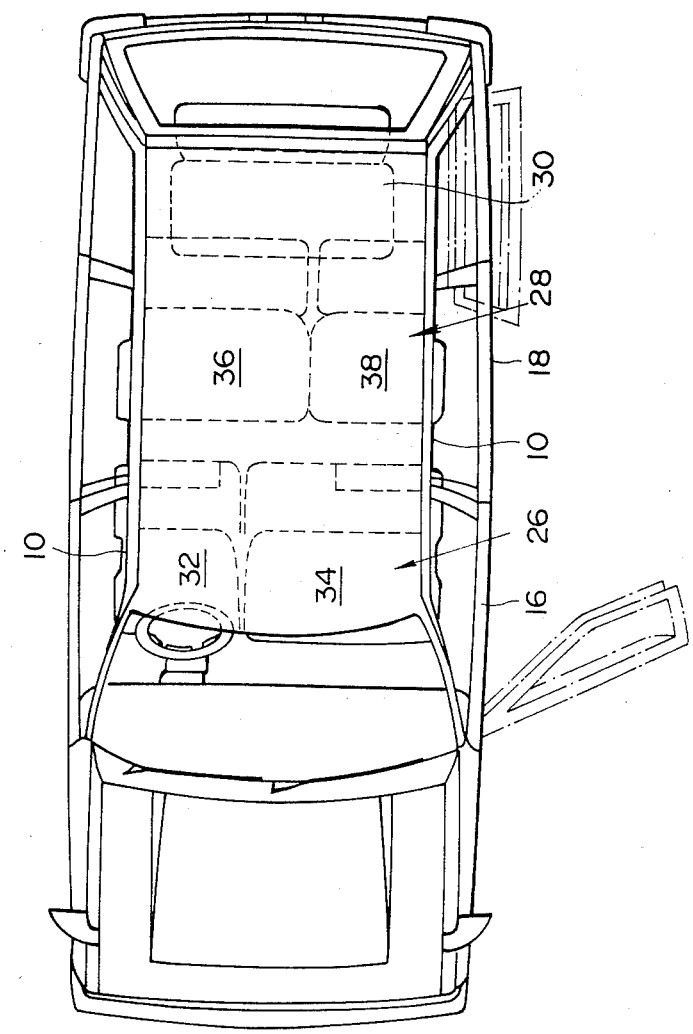
FIG. 3 is a plan view of the vehicle of FIG. 1.

Referring now to the drawings, particularly to FIGS. 1 to 4, a vehicle has a door opening 10 at each side thereof, which extends between a front pillar 12 and a rear pillar 14. A front swinging door 16 is hinged to the front vertical edge of the door opening 10 in a per se well-known manner. The front door 16 is adapted to close the front moiety of the door opening 10. A rear sliding door 18 is suspended from upper, lower and waist guide rails 20, 22 and 24 by means of engagement of slider assemblies thereto. The rear sliding door 18 is adapted to close the rear moiety of the door opening. The front swinging door 16 and the rear sliding door 18 are adapted to oppose each other at rear and front edges thereof. As will be seen from the drawings, no pillar (center-pillar) is provided between the rear edge of the front swinging door 16 and the front edge of the rear sliding door 18.

Front, second and rear seats 26, 28 and 30 are arranged within a vehicle compartment. The front seat 26 comprises a driver's seat 32 and front passenger's seat 34 for two occupants. The driver's seat 32 and front passenger's seat 34 are separate and movable independently. The second seat 28 comprises a stationary seat 36 and a folding seat 38. The stationary seat 36 is adapted for two occupants and the folding seat 38 is adapted for one occupant. The corners of the second and rear seats 28 and 30 are rounded.

Figure 4:
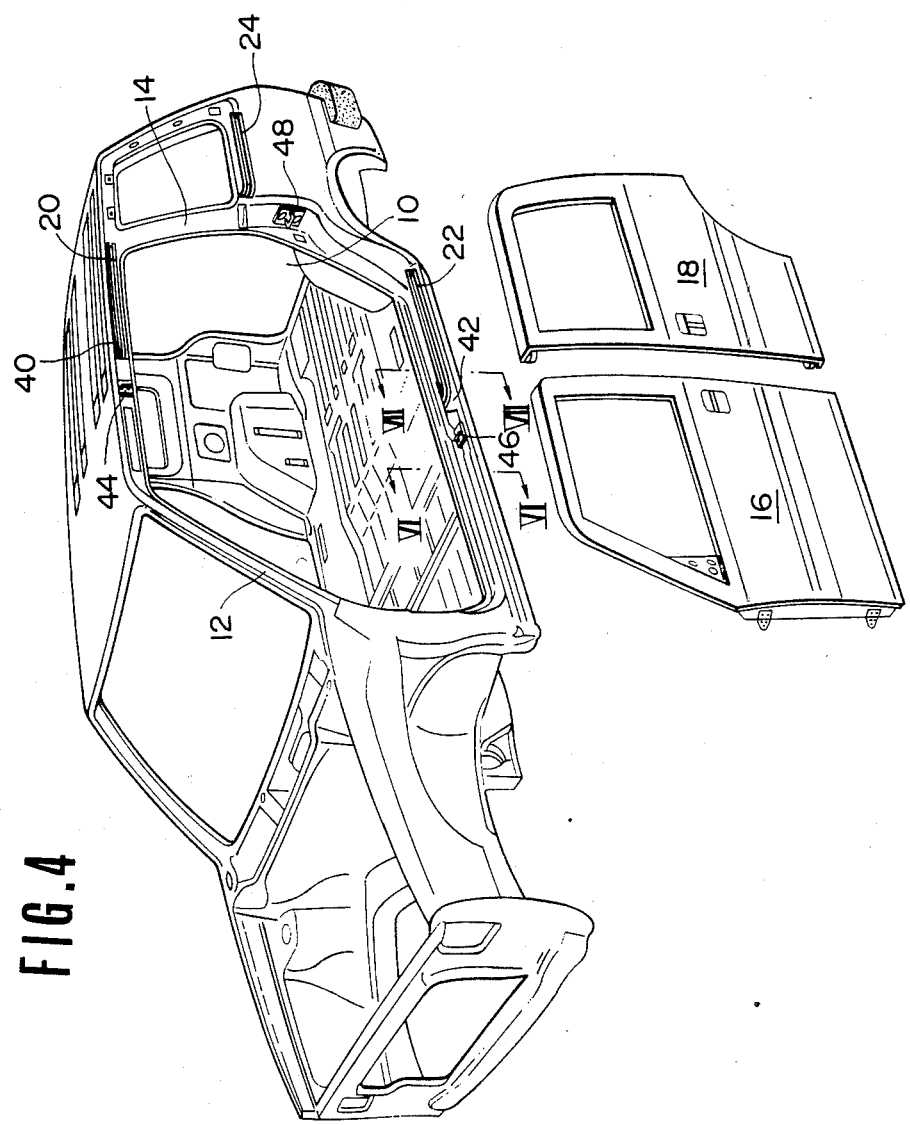
FIG. 4 is an exploded perspective view of the vehicle, in which an engine hood and wheels are neglected and front and rear doors are detached from the vehicle body.

As particularly shown in FIG. 4, the upper guide rail 20 extends substantially along a roof side rail 40 and has a front end which curves inwardly and extends through an opening in the roof side rail 40. The lower guide rail 22 extends along a side sill 42 and has a inwardly curving front end portion extending through an opening in the side sill. The waist guide rail 24 extends along essentially the entire length of the rear fender. Near the front ends of the upper and lower guide rails 20 and 22, upper and lower door strikers 44 and 46 are secured respectively onto the roof side rail 40 and the side sill 42. The upper and lower door strikers 44 and 46 are adapted to engage with upper and lower door locks of the front swinging door. A rear door striker 48 is secured onto the rear pillar 14 for engagement with a rear door lock of the rear sliding door.

The upper and lower guide rails 20 and 22, secured to the roof side rail 40 and the side sill 42 respectively, serve not only to allow sliding movement of the sliding door 18 but also as reinforcements of the roof side rail and the side sill to facilitate cener-pillarless body structure of the vehicle with sufficient resistance to bending stresses.

The detailed structure of the vehicle body of the preferred embodiment will be described below with reference to FIGS. 5 to 19 which show various parts of the vehicle bodywork.

Referring to FIGS. 5 to 7, a vehicle floor assembly 50 of the vehicle is illustrated. The rear edge of a vehicle floor front panel 52 is joined to the front edge of a floor rear panel 54. Both of the front and rear panels 52 and 54 are essentially flat so as to form an essentially flat floor for the vehicle. The front edge of the floor front panel 52 is connected to a dash panel 56 and the rear edge of the floor rear panel 54 is connected to a rear end panel 58. Lateral edges of the floor front and rear panels 52 and 54 are fixedly secured to the side sills 42 and supported thereby. The front edge of the floor front panel 52 is supported by a front suspension cross-member 60. Likewise, the floor rear panel 54 is supported by a rear suspension cross-member 62 near its front edge. A plurality of auxiliary cross-members 64, 66, 68, 70 and 72 extend laterally between the side sills 42 on both lateral sides to support the assembled floor front and rear panels 52 and 54.

The dash panel 56 is associated with a cowling assembly 74. An engine compartment 76 for housing an engine and associated equipment is defined forward of the dash panel 56.

As clearly seen from FIGS. 6 and 7, the side sills 42 have box-dashed cross-sections defined by side sill inner and outer members 78 and 80 fixed to each other at their upper and lower edges. The side sill inner member 78 is formed with a stepped upper horizontal surface 82 on which the lateral edge of the floor front and rear panels 52 and 54 are mounted. The side sill outer member 80 is also formed with a longitudinally extending step 84 supporting the lower guide rail 22 which has a channel-shaped cross-section. The cross-members supporting the assembled floor front and rear panels 52 and 54 are fixed to the side sill inner members 78 by way of welding or other appropriate processes which are per se well-known.

With the floor assembly structure as disclosed hereabove, utility space in the vehicle compartment can be significantly increased in comparison with the conventional sedan type vehicle due to the essentially flat floor of the vehicle. Furthermore, by mounting the lower guide rail onto the side of the side sill, the elevation of the vehicle floor can be lowered in comparison with the floor elevation of conventional van-type vehicles. This relatively lower floor provides a more comfortable height for the vehicle compartment and is more convenient for getting into and out of the vehicle.

Figure 8:
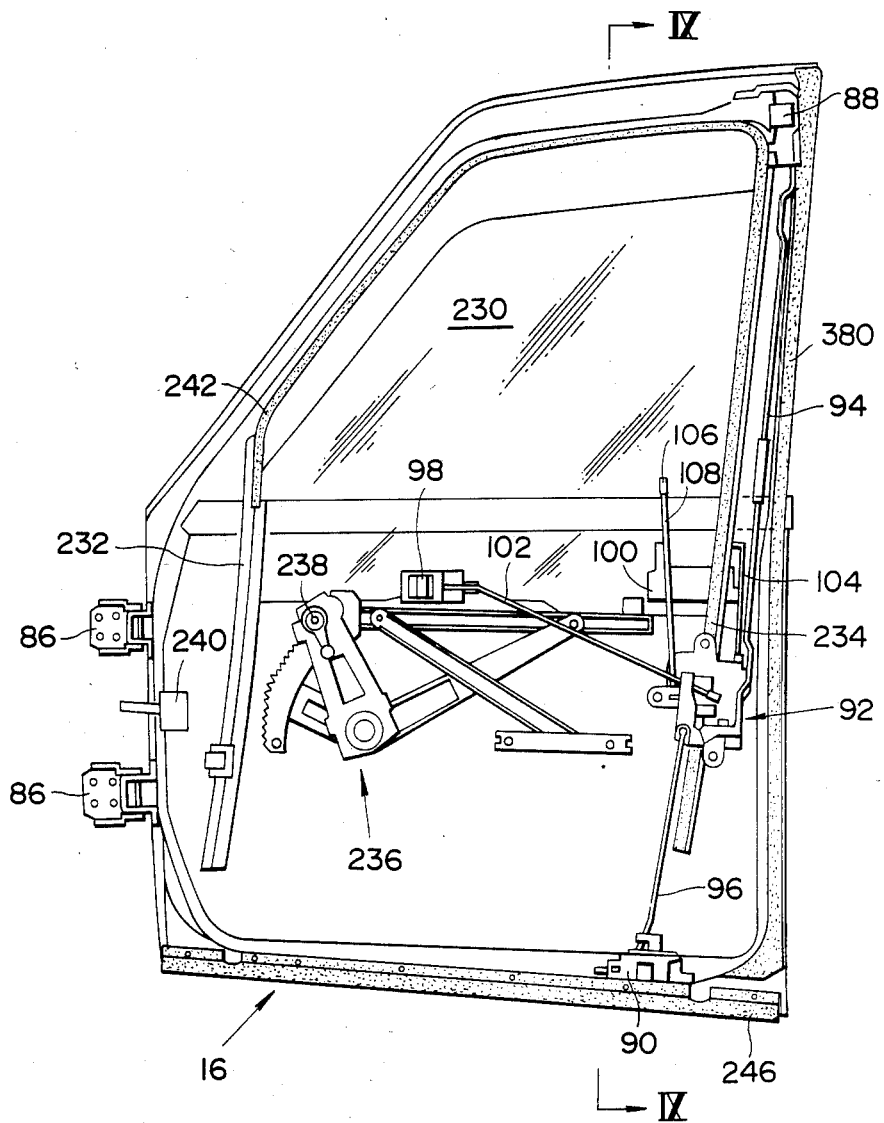
FIG. 8 is an elevation of a front swinging door, from which the inside lining of the door has been removed so as to show the front door mechanism.

FIGS. 8 and 9 show a front swinging door structure in detail. The front edge of the front swinging door 16 is attached by a pair of hinge assemblies 86 to the lower portion of the front pillar 12. As set forth previously, upper and lower door locks 88 and 90 are provided at the respective upper and lower rear corners of the front swinging door 16.

The upper door lock 88 is disposed in the upper rear corner of the front swinging door 16 so as to be engageable with the upper door striker 44 rigidly mounted on the roof side rail 40. The lower door lock 90 is engageable with the lower striker 46 rigidly mounted on the side sill 42.

The front swinging door 16 is further provided with a central lock operating assembly 92. This assembly is operatively connected with the upper door lock 88 via a rod 94 and with the lower door lock 90 via a rod 96.

An interior door handle 98 is located in a suitable location on the inner surface of the front swinging door 16, while an outside door handle 100 is suitably positioned on the exterior thereof. The assembly 92 is interconnected with the inside handle 98 by means of a rod 102 and with the outside handle 100 by means of a rod 104. When either one of the inside handle 98 or the oustide handle 100 is manipulated to open the front swinging door 16, the operation assembly 92 releases the upper door lock 88 and lower door lock 90 simultaneously from the upper striker 44 and lower striker 46, respectively.

A key operable lock cylinder (not shown) is located in a suitable position within the front swinging door 16, while a locking/unlocking knob 106 is adapted to protrude from a location at the base of the door window. The operating assembly 92 is operatively connected to the lock cylinder by means of a rod (not shown) and with the knob 106 via a rod 108. When the lock cylinder or the knob 106 is operated to lock the front swinging door 16, the operative connection between the inside handle 98 and outside handle 100 and the upper door lock 88 and lower door lock 90 is cancelled.

As shown in FIG. 10, the upper door lock 88 includes a base plate 110 having a generally U-shaped configuration as seen in plan, which is rigidly mounted on the front swinging door 16. A latch member 112 is pivotally mounted on the base plate 110 by means of a pin 114 so as to engage the outboard end of the upper striker 44, which is secured to an outer member 116 of the roof side rail 40, and which is generally U-shaped as seen in plan. A pawl member 118 is pivotally mounted on the base plate 110 by means of a pin 120. This member functions to prevent the latch member 112 from pivotting after the latter has engaged the upper striker 44 after the door is closed. A lever 122 is pivotable about a pin 124 mounted on the base plate 110. The upper end of the rod 94 is anchored to the lever 122 such that, when the rod 94 is drawn downwardly, the lever 122 causes the pawl member 118 to undergo clockwise rotation (as seen in FIG. 10), thus releasing the pawl member 118 from the latch member 112.

The upper door lock 88, is arranged such that, when the front swinging door 16 is closed, the rod 94 does not follow the movement of the latch member 112 and remains stationary. The latch member 112 is constantly biased clockwise by a helical spring (not shown) or any suitable biasing means while the pawl member 118 is constantly biased counterclockwise by a helical spring (not shown) or any other suitable biasing means.

Figure 11:
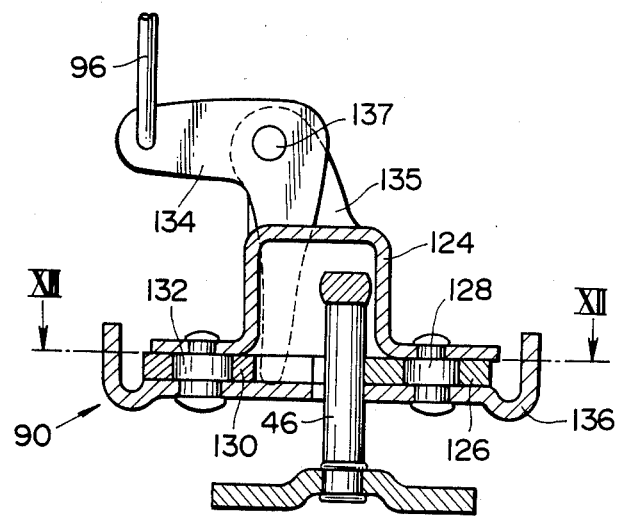
FIG. 11 is a cross-sectional view of a lower door lock of the front swinging door.
Figure 12:
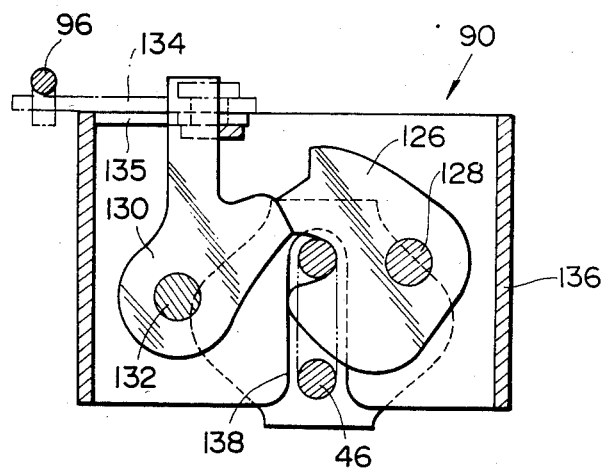
FIG. 12 is a view taken along line XII—XII of FIG. 11.

As shown in FIGS. 11 and 12, the lower door lock 90 includes a box-shaped cover 124 and a base 136. A latch 126 is secured to the cover 124 and a base 136 for pivotal movement about a pivot pin 128 protruding from the base 124. A pawl 130 is co-operative with the latch 126 and pivotable about a pivot pin 132. The pawl 130 is adapted to engage with the latch 126. A lever 134 pivotably mounted onto a bracket 135 extending from the cover 124 and the base 136 via a pivot pin 137. The lever 134 is connected to the rod 96 and is co-operatively connected to the pawl 130 for operating the latter according to the operation of the central door lock assembly 92. The lower door lock 90 is rigidly secured onto the lower edge of the front door inner panel 16.

The base 136 has an opening 138 through which the lower door striker 46, having a generally U-shaped front elevation, can enter. The pawl 130 is adapted to prevent the rotation of the latch 126 once the latter engages the lower striker 46. The lever 134 is adapted to cause the pawl to rotate counterclockwise (as seen in FIG. 12) when the rod 96 is drawn upwardly. This disengages the latch 126 from the lower striker 46 to permit the front swinging door 16 to open. When the front swinging door 16 is closed, the lower striker 46 engages the latch 126. The latch 126 may be biased clockwise by means of a suitable biasing means such as helical spring, while the pawl 130 and the pin 132 may be biased counterclockwise by means of a biasing means such as a helical spring.

Figure 13:
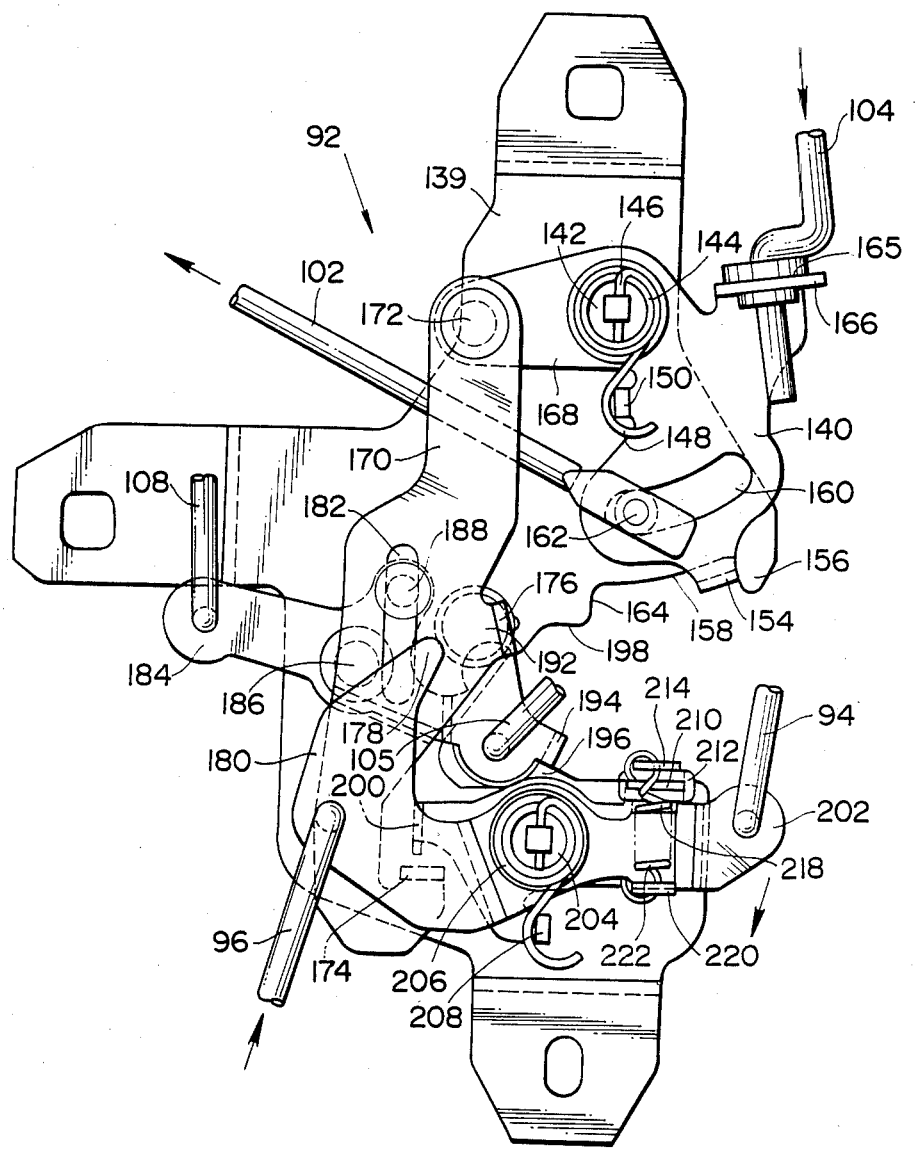
FIG. 13 is an enlarged elevation of a center door lock operating assembly of FIG. 8.

As shown in FIG. 13, the lock operating assembly 92 includes a base plate 139 rigidly secured to the front swinging door 16. At the upper portion of the base plate 139, a release lever 140 is pivotally mounted on a pin 142 which is perpendicular to the general plane of the base plate 139. It should be noted at this time, that all the pins referred to hereinafter are also perpendicular to the general plane of the base plate 139.

A helical spring 144 is wound around the pin 142 and one end 146 thereof is anchored to the pin 142. The other end 148 of this spring is anchored to a lug 150 which extends forwardly from the left edge of the release lever 140 at a location below the pin 142. The spring 152 thus yieldably urges the release lever 140 counterclockwise to its inoperative position shown in FIG. 13, in which a lug 154 projecting from the lower end of the release lever 140 abuts a first stop 156. This stop 156 delimits the right end of an arcuate notch 158 which lies near the center of the base plate 139.

The release lever 140 is formed with an arcuate slot 160 whose center of curvature coincides with the axis of the pin 142. A pin 162 slidable in and along the arcuate slot 160 is fixed to one end of the rod 102, the other end of which, as previously described, is operatively connected to the interior door handle 98. Pulling the rod 102 to the left as seen in the drawings will move the release lever 140 to its operative position, in which the lug 154 abuts a second stop 164. This second stop delimits the left end of the notch 158.

The rod 104 operatively connected with the exterior door handle 100 is formed with a stepped portion which passes through an aperture in which an elastomeric grommet 165 is disposed and which is formed in a lug 166 formed on the release lever 140. In this arrangement, urging the rod downwardly will also move the release lever 140 to the operative position.

An arm 168 extends to the left from an upper portion of the release lever 140 and has a sublever 170 rotatably mounted on the free end thereof by means of a pin 172.

The lower end of the sublever 170 is formed so as to have a generally "J" shape which terminates at an engaging section 174. This engaging section 174 is formed by bending the end of the sublever 170 to the rear (as seen in the drawings).

An abutment 176 extends forwardly from the right edge of an intermediate portion of the sublever 170. This abutment is located such that when the release lever 140 is in its inoperative position the abutment lies in the path of rotation of a hook-shaped end or engaging section 178 of a second connecting lever 180, which will be described in detail later, while in the operative position of the release lever 140, it is raised upwardly out of the path of rotation mentioned above.

The sublever 170 is formed with a slot 182 in the intermediate portion thereof. A locking lever 184 is rotatably mounted on an intermediate part of the base plate 139 by means of a pin 186. A pin 188 is studded on the lever 184 above the pin 186 and slidably engaged in the slot 182.

The locking lever 184 is operatively connected to an overcenter or two position snap action spring 192 so as to be biased toward either one of two positions. This spring is retained at one end by the base plate 139 and at the other end by the lever 184. In the unlocked position of the locking lever 184 (as shown in FIG. 13) a rearwardly oriented lug 194 formed at the right end of the lever 184 abuts a first stop 196 formed in a curved edge of an intermediate portion of the base plate 139, whereas in the locked position the lug 194 abuts a second stop 198 formed in a curved edge of the base plate 139 which faces the above-mentioned edge from above.

The lever 184 is connected at its left end to the lower end of the rod 108 which, as previously described, is connected to the lock button or knob 106, and at its right end to the rod 105 which in turn is connected to the lock cylinder. The lever 184 is thus movable to the locked or unlocked position when either one of the knob 106 or the lock cylinder is operated and maintained in the selected position under the influence of the spring 192.

In the above arrangement, when the lever 184 assumes its unlocked position, the sublever 170 also assumes an engaged position as shown in FIG. 13. With levers 184, 170 in these positions the engaging section 174 is engageable with an abutment 200 of a first connecting lever 202 which will be described later. However, upon the lever 184 assuming its locked position the sublever 170 assumes a position in which the engaging section 174 is no longer engageable with the abutment 200.

Thus, when the sublever 170 is in its engaged position it can be raised by moving the release lever 140 to the operative position so that the abutment 200 is engaged by and moved upward by the engaging section 174, thus rotating the first connecting lever 202. However, in the released position of the sublever 170, the engaging section 174 misses the first connecting lever 202 despite the movement of the release lever 140 into the operative position.

The first and second connecting levers 202 and 180 are pivotally mounted on a lower part of the base plate 139 by means of a common pin 204. A helical spring 206 is wound around the pin 204 and anchored at one end to same. The other end of the spring 206 is anchored to a forwardly directed lug 208 formed on the lower edge of the first connecting lever 202. Under the bias of the spring 206, the first connecting lever 202 normally remains in an inoperative position, in which a lug 210 formed on the right upper edge of the lever 202 and about which an elastomeric cushioning member 212 is disposed, abuts against a forwardly directed stop 214 formed on the base plate 139.

The first connecting lever 202 is formed with the previously mentioned abutment 200 at its leftmost end while retaining the lower end of the rod 94 at its rightmost end, the latter mentioned rod 94 providing an operative connection with the upper door lock 88 as previously described.

Thus, when the locking lever 184 is in its unlocked position and the sublever 170 is raised, the engaging section 174 contacts the first connecting lever 202, rotating same clockwise and thus pulling rod 94 downwards to release the upper door lock 88.

A pair of lugs 218 and 220 project from the right upper end and right lower end of the second connecting lever 180, respectively. A coil tension spring 222 is retained at one end by the lower lug 220 of the lever 180 and at the other by stop 214 of the base plate 139. The lever 180 is biased counterclockwise by the spring 222 to normally assume an inoperative position shown in FIG. 13, in which the upper lug 218 remains in contact with the cushioning member 212 on the lug 210 of the first connecting lever 202.

The second connecting lever 180 is connected to the rod 96 (operatively connected to the lower door lock 90) at its left end and formed at the upper extension thereof with the hook-shaped end 178 previously mentioned.

Due to the engagement of the lug 218 with the lever 202, the lever 180 is rotated to the operative position in synchronism with the lever 202 from its inoperative position to the its operative position, thus pulling the rod 96 upwardly to release the lower door lock 90.

However, the second connecting lever 180 is movable to its operative position independently of the first connecting lever 202 as already discussed and as shown, when the rod 96 is raised temporarily via the interconnection with the latch 126 in the lower door lock 90 during the closing of the front swinging door 16. Thus, assuming that the sublever 170 is in the released position and the release lever 140 is in the inoperative position, the hook-shaped end 178 of the lever 180 will engage with the abutment 176 to cause the sublever 170 to return to its engaged position. This induces a simultaneous movement of the locking lever 184 from its locked position to its unlocked position.

This endows the so-called "self-cancellation" function on the arrangement which unlocks the front swinging door 16 even though the door may be closed with the lock cylinder or the knob 106 actuated to the locked position, at the instant the front swinging door 16 is closed.

However, if the outside handle 100 is manually held to keep the release lever 140 in its operative position while the front swinging door 16 is closed, both the lever 184 and sublever 170 are maintained in their locked and released positions respectively and the rod 96 rises and moves the second connecting lever 180 to its operative position. Thus, because the abutment 176 has then been raised by the release lever 140 out of the path of the engaging section 178, and the sublever 170 maintains its released position.

This endows the so-called "keyless locking" function on the arrangement which permits the front swinging door 16 to be locked without the use of a key.

The door lock structure for the front swing door set forth above has been disclosed in further detail in the co-pending U.S. patent application Ser. No. 417,832, disclosure of which is herewith incorporated by reference for disclosure purpose.

Returning to FIG. 8, a window pane 230 is associated with front and rear lower sashes 232 and 234 for up-/down movement therealong. A window regulator 236 with a regulator handle 238 is associated with the window pane 230 for up/down movement of the latter. A door check 240 is installed on the front edge of the front swinging door 16 for detecting the open position thereof. A glass-run seal 242 extends along the door sash 12 and is engageable with the circumferential edge of the window pane 230 for guiding up/down movement thereof.

A weatherstrip 380 is equipped along the rear edge of the front swinging door 16 and a rubber seal 246 is attached along the lower edge of the door.

Figure 14:
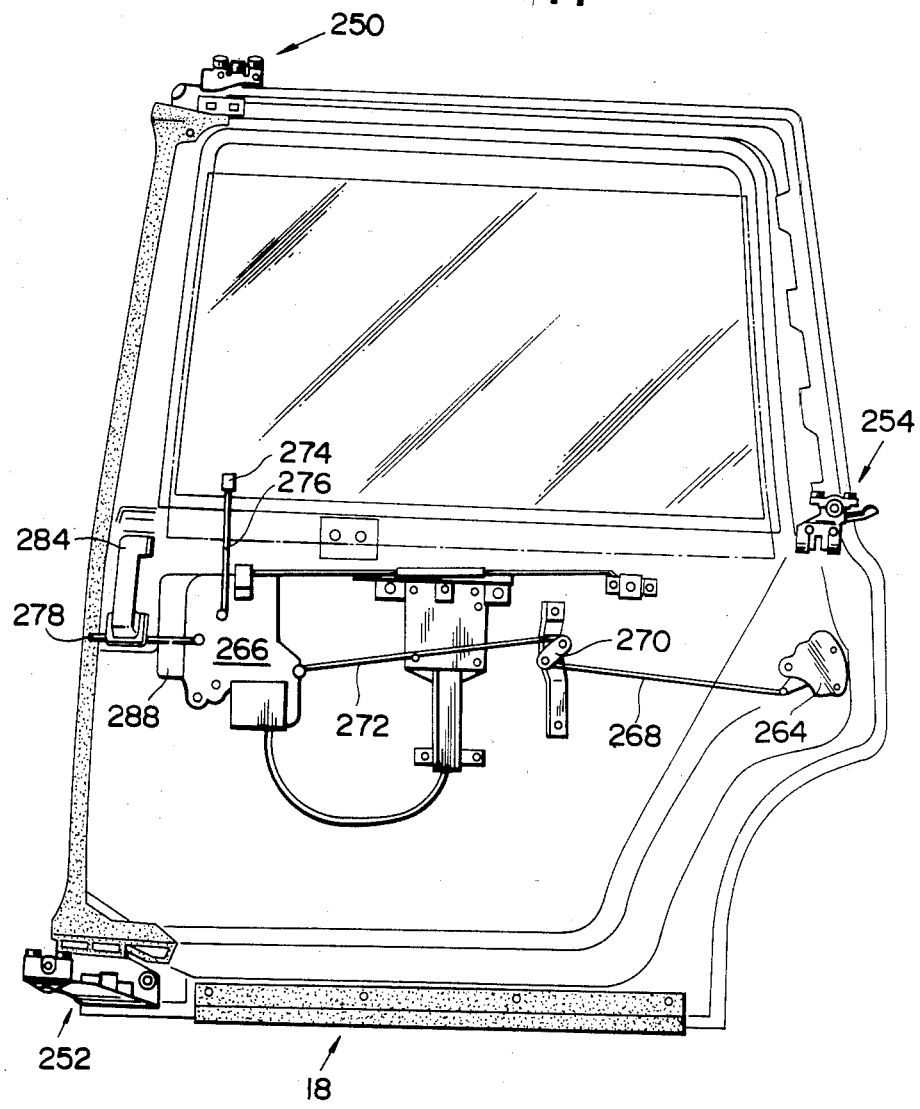
FIG. 14 is an elevation of the rear sliding door, from which the inside lining of the door has been removed for explanation.
Figure 15:
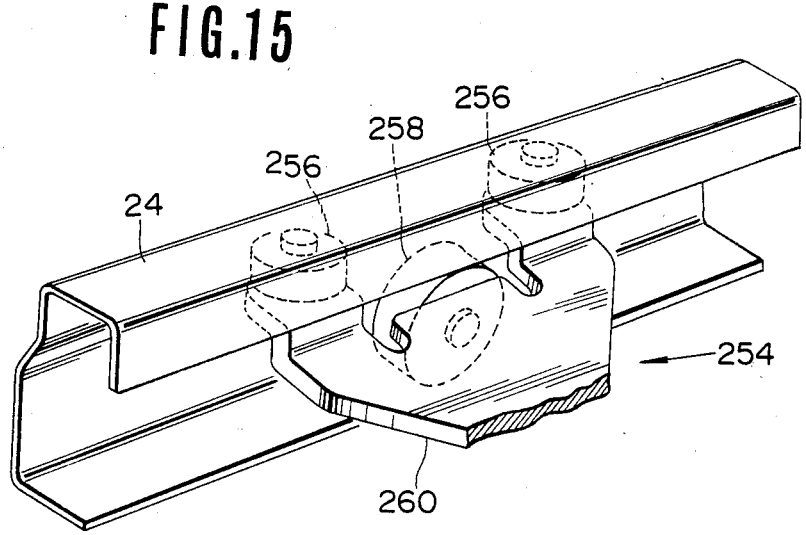
FIG. 15 is a perspective illustration of a waist slider assembly mounted on the rear sliding door.
Figure 16:
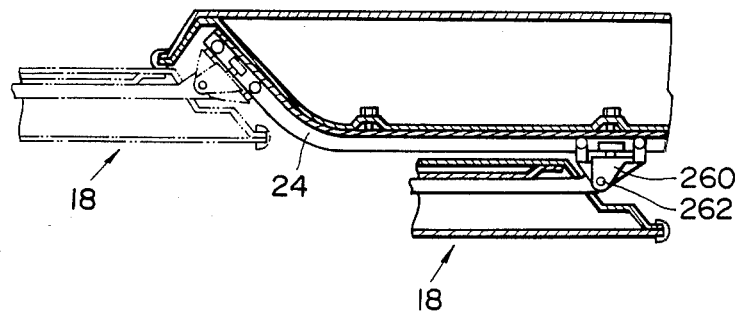
FIG. 16 is a horizontal sectional view illustrating movement of the waist slider assembly of FIG. 15.

FIG. 14 shows the detailed structure of the rear sliding door 18. The rear sliding door 18 is provided with upper and lower slider assemblies 250 and 252 respectively near its upper and lower front corners. Corresponding to the waist guide rail 24, a waist slider assembly 254 shown in more detail in FIG. 15 is also provided on the rear sliding door near its rear edge. The slider assembly 254 has a pair of horizontal rollers 256 rotatably mounted on vertical rotational axles projecting from a guide shoe 260 and a vertical roller 258 rotatably mounted on a horizontal axle projecting from the guide shoe. The upper and lower slider assemblies 250 and 252 are of the same structure as that of the waist slider assembly 254. Each of the rollers 256 and 258 is adapted to engage the waist guide rail 24 for sliding movement therealong. As shown in FIG. 16, the waist slider assembly has the guide shoe 260 pivotally secured to the rear sliding door for pivotal movement about a pivot 262. This allows the rear sliding door 18 to conform as closely as possible to the contours of the vehicle exterior as the door is opened and closed, as illustrated by comparison of the door positions drawn in solid and phantom lines in FIG. 16.

Returning to FIG. 14, the rear sliding door 18 is provided with the rear door lock 264 near its rear edge. The rear door lock 264 is connected to a door lock operating assembly 266 by way of a rod 268, bell crank 270 and a second rod 272. The door lock operating assembly 266 is also connected to a door lock knob 274 via a rod 276 for locking and unlocking the door lock operating assembly. A child safety lock 278 is associated with the door lock operating assembly 266. Also, a door inside handle 284 is connected to the door lock operating assembly 266 by means of a rod (not shown) and a door outside handle 288 is connected to the latter by means of a rod (not shown).

The child safety lock as connected to the door lock operating assembly 266 has been disclosed in the co-pending U.S. patent application Ser. No. 413,529, disclosure of which is herewith incorporated by reference for disclosure purpose.

Figure 17:
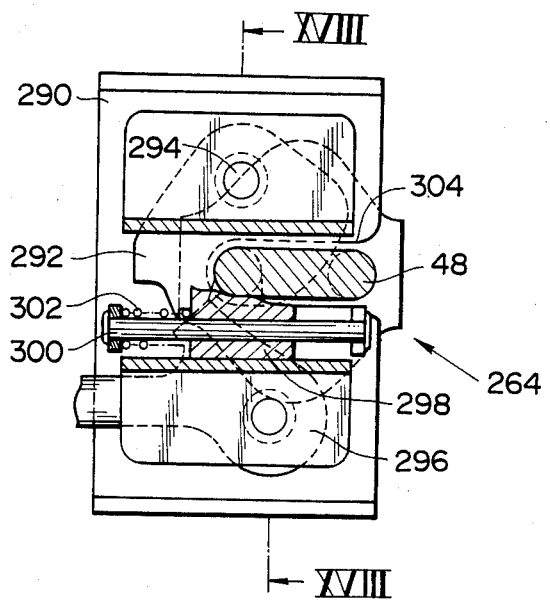
FIG. 17 is an elevation of the door lock of the rear sliding door.
Figure 18:
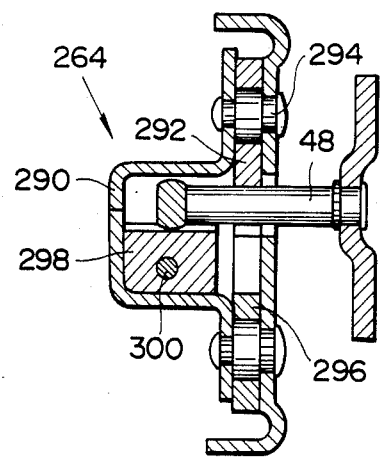
FIG. 18 is a section taken along line XVIII—XVIII of FIG. 17.

As shown in FIGS. 17 and 18, the door lock 264 includes a box-shaped base 290. A latch 292 is pivotably installed within the base and pivotable about a pivot pin 294 protruding from the base. A pawl member 296 is also pivotably supported by the base and co-operates with the latch 292. The pawl member 296 is connected to the door lock operating assembly 266 via the rods 268, 272 and the bell crank 270. A wedge-shaped member 298 with a rod 300 is provided within the base. A tension spring 302 encircles the rod 300 in order to bias the wedge-shaped member 298 toward right in FIG. 17. This wedge-shaped member 298 is adapted to contact with the rear door striker 48, when the door is closed to dampen the movement of the rear door striker and so prevent noises due to vibration.

The latch 292 is engageable with the striker 48 when the sliding door is closed. In this case, the pawl member 296 engages the latch 292 to retain the latter in its latching position. By manual operation of either the inside handle 284 or the outside handle 288, the pawl member 296 is rotated counterclockwise in FIG. 17 via the door lock operating assembly 266, the rod 272, the bell crank 270 and the rod 268. The pawl member 296 is thus released from engagement with the latch 292 to allow the latter to rotate counterclockwise. By this counterclockwise movement of the latch 292, the striker becomes free from engagement with the recess 304 of the base 290 so as to allow the sliding door to open.

Figure 19:
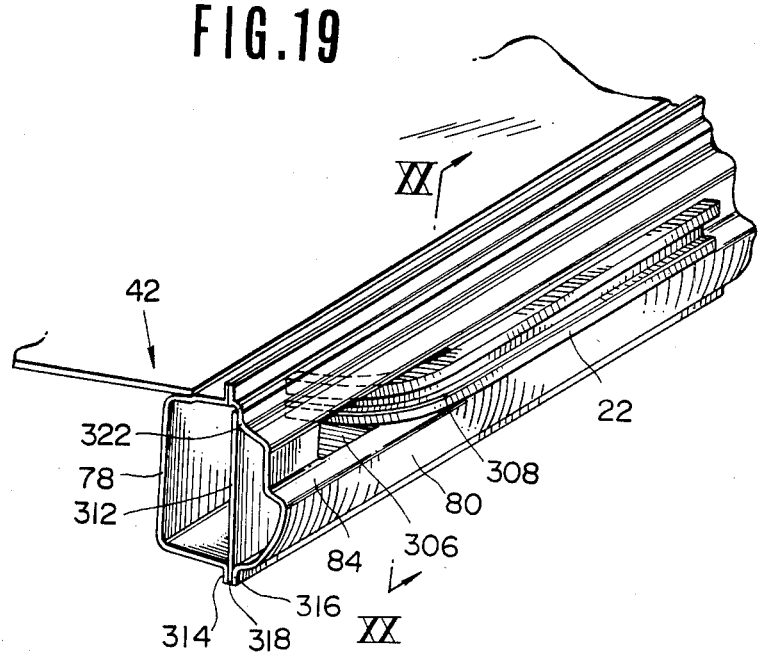
FIG. 19 is a perspective view of a part of a side sill of the vehicle framework, on which a lower guide rail is mounted.
Figure 20:
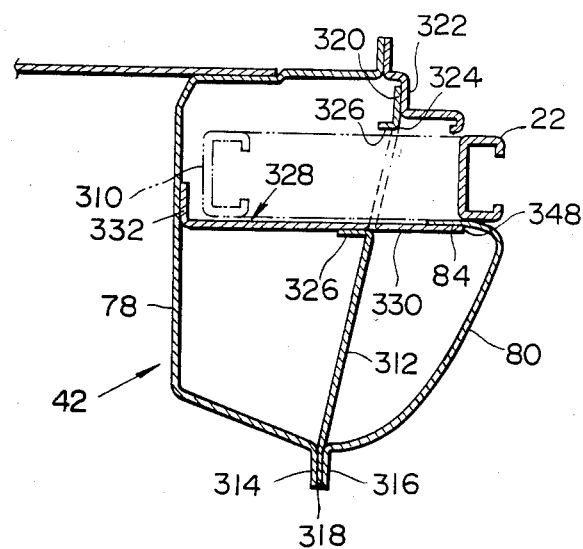
FIG. 20 shows a cross-section taken along line XX—XX of FIG. 19.
Figure 21:
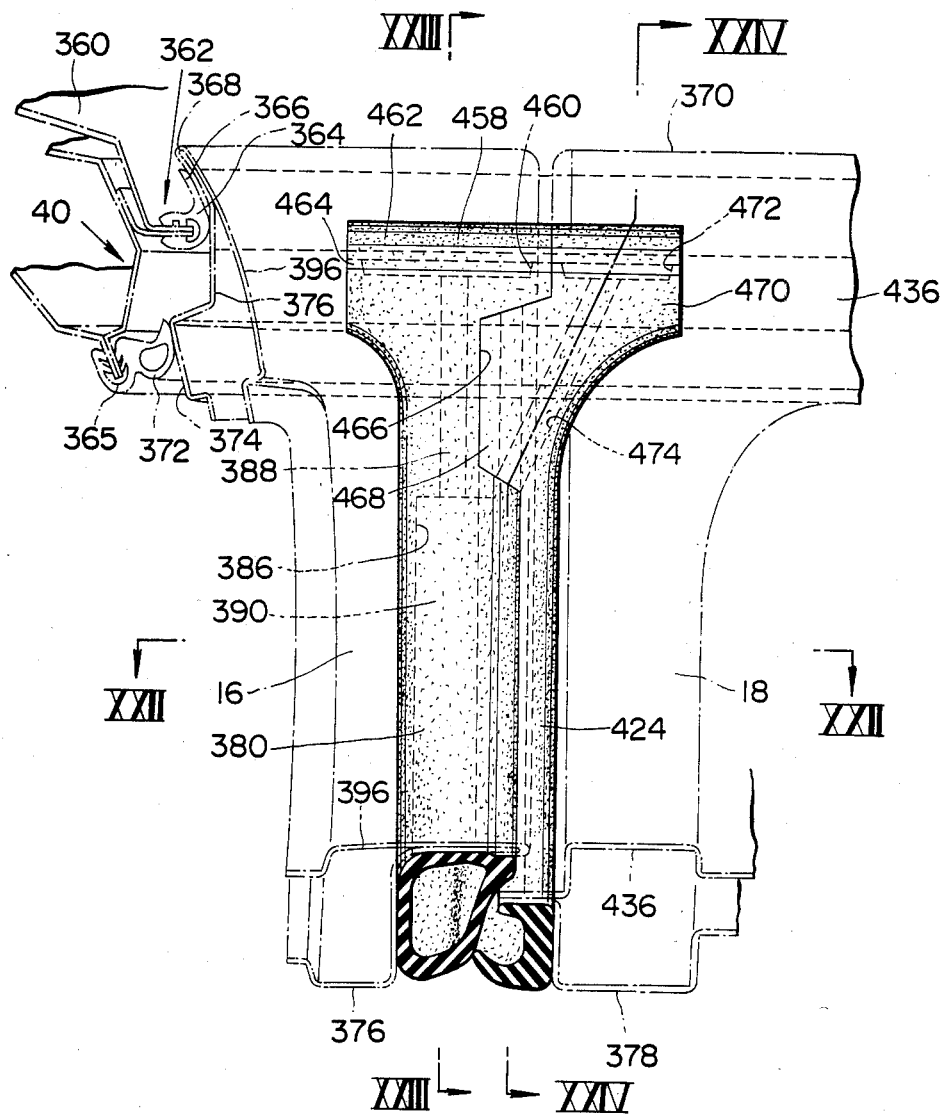
FIG. 21 is an elevation of part of the interface structure between the front and rear doors.
Figure 22:
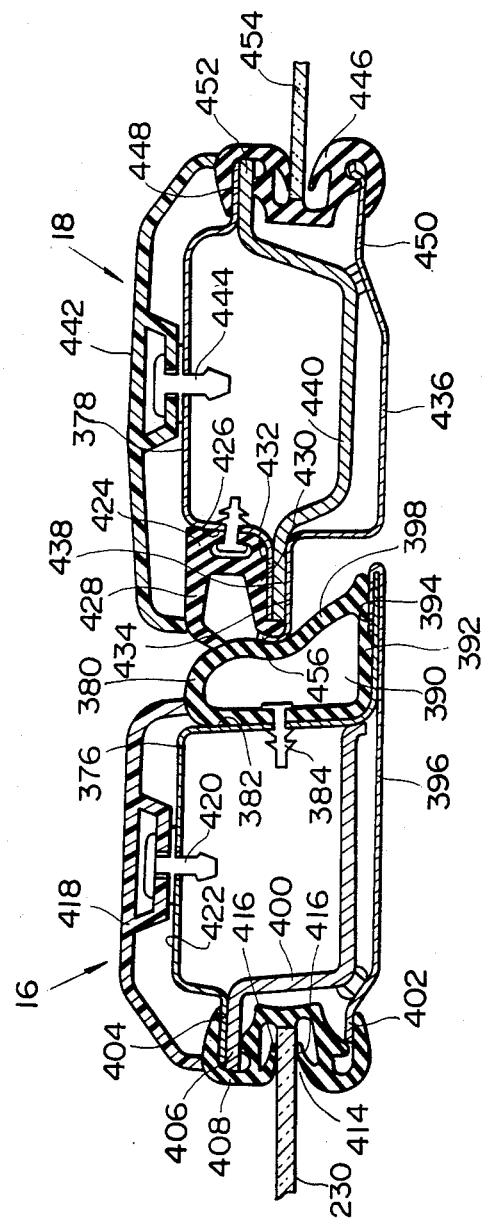
FIG. 22 shows a cross-section taken along line XXII—XXII of FIG. 21.
Figures 23, 24:
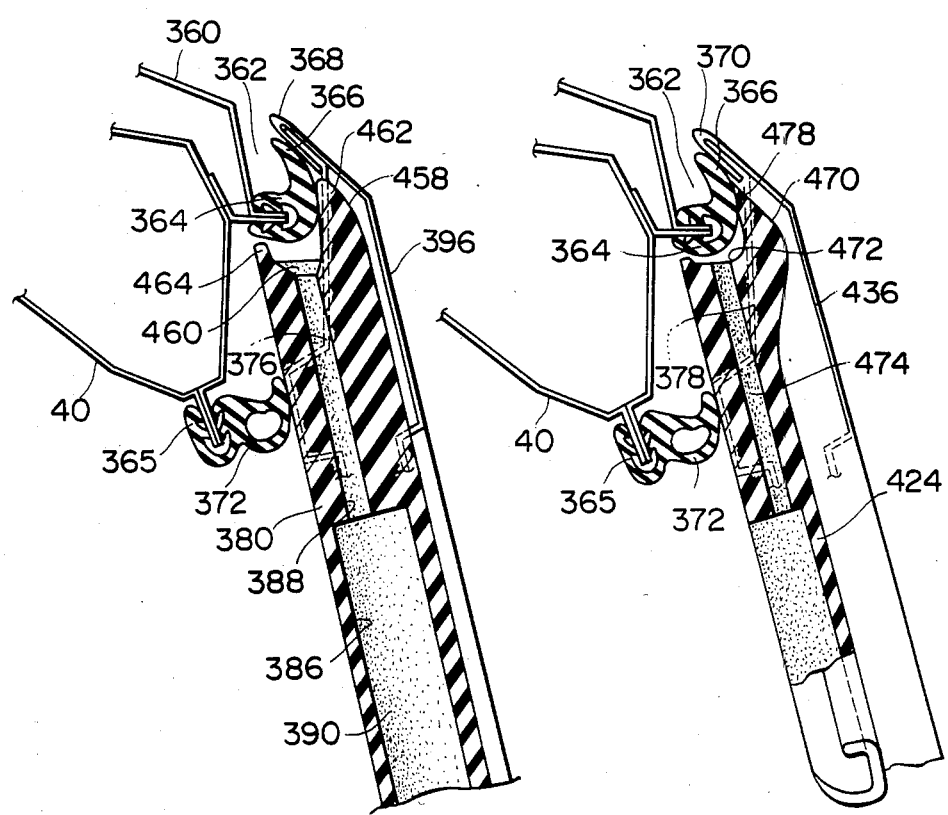
FIG. 23 shows a section taken along line XXIII—XXIII of FIG. 21.
FIG. 24 shows a section taken along line XXIV—XXIV of FIG. 21.

As shown in FIGS. 19 and 20, the side sill outer member 80 is formed to have the step 84 on which the lower guide rail 22 is fixedly mounted. Lower guide rail 22 is of substantially channel-shaped cross-section for secure engagement with the lower slider assembly 252 of the sliding door. The side sill outer member 80 is formed with a substantially rectangular opening 306. The lower guide rail 22 curves through the rectangular opening 306 starting at a point 308 near its forward end. The front end 310 of the lower guide rail 22 is thus fully received within the closed section defined in the side sill 42.

An essentially vertical reinforcement member 312 is inserted in the closed section of the side sill 42. The lower edge 318 of the vertical reinforcement member 312 is inserted between the lower flanges 314 and 316 of the side sill inner and outer members 78 and 80. The upper edge 320 of the vertical reinforcement member 312 is secured to the vertical section 322 of the side sill outer member 80. At the portion corresponding to the rectangular opening 306 of the side sill outer member 80, the vertical reinforcement member 312 is also provided with a substantially rectangular opening 324 through which the end portion 310 of the lower guide rail 22 extends. A flange 326 is extended from the edge of the rectangular opening 324 of the vertical reinforcement member 312. Likewise, flange 326 extends towards inside of the closed section of the side sill from the lower lateral edge of the rectangular opening 306.

A horizontal reinforcement member 328 is inserted in the internal space of the side sill 42. The horizontal reinforcement member 328 has a substantially horizontal major portion 330 and a vertical wall portion 332 which extends from the inner edge of horizontal portion 330.

As shown in FIG. 20, the edge 348 of horizontal portion 330 is fixed to the lower surface of the flange extending from the lower edge of the rectangular opening 306 in the side sill outer member 80. Horizontal portion 330 is also fixed to the upper surface of the flange 326 extending from the lower edge of rectangular opening 324 in vertical reinforcement member 312. The vertical wall portion 332 is fixed to the inner surface of the side sill inner member 78.

The mounting structure for the lower guide rail has been disclosed in further detail in the pending Japanese Patent Application No. 57-124194 and co-pending European Patent Application No. 83106839.0 corresponding to the foregoing Japanese Patent Application, the disclosure of which is hereby incorporated by reference for disclosure purpose.

As shown in FIGS. 21 to 24, a weatherstrip 380 is mounted along the rear vertical edge of the front door 16. Likewise, a weatherstrip 424 is installed along the front vertical edge of the rear door 18.

The longitudinal edge of the roof outer panel 360 along the roof side rail 40 is bent to form a drip-channel 362 in conjunction with a drip seal 364 fastened to its edge. The lateral edge of the roof outer panel 360 is supported by the roof side rail 40 to which a weatherstrip 365 is attached. The drip seal 364 has a lip 366 extending upwardly. The lip 366 is adapted to contact the upper edges 368 and 370 of the front and rear doors 16 and 18. Likewise, the weatherstrip 365 has a portion 372 protruding outwardly. The portion 372 of the weatherstrip 365 is adapted to contact a portion 374 of a door inner panel 376 of the front door 16. The portion 372 of the weatherstrip 365 is also adapted to contact the corresponding portion of the door inner panel 378 of the rear door. Therefore, a double water-proof seal between the upper frame of the vehicle body and the upper edge portions 368 and 370 of the front and rear doors 16 and 18 is provided by the drip seal 364 and weatherstrip 366.

The weatherstrip 380 is mounted on the vertical surface 382 of the door inner panel 376 by means of a resin fastener 384. The weatherstrip 380 is hollow and essentially cylindrical in cross-section, so that it defines a through opening 386 which comprises an upper smaller diameter section 388 and a lower larger diameter section 390. One wall 392 of the weatherstrip 380 is in contact with a flat surface 394 where the rear end of a door outer panel 396 is bent back over the rear vertical edge of the door inner panel 376. Another wall 398 of the weatherstrip 380 opposes the front vertical edge of the rear door 18 in order to establish a water-proof seal therebetween when the doors are closed.

The front door inner panel 376 and the front door outer panel 396 define an internal space therebetween, in which a reinforcement member 400 is inserted. The outer panel 396 has a flange 402, and the inner panel has a flange 404 to which a flange 406 of the reinforcement member 400 is attached. A window weatherstrip 408 is engaged to the flanges 402, 404 and 406. On the other hand, central sections 414 of the window weatherstrip 408 engages the edges of the window pane 230. The free ends of lips 416 extending from the central section 414 contact the window pane 230 to establish a water-proof seal. A garnish 418 is fastened with resin fasteners 420 to a surface 422 of the inner panel 376 facing the vehicle compartment.

Similarly, the weatherstrip 424 of the rear door 18 is installed on the front vertical surface 426 of the rear door inner panel 378. The weatherstrip 424 is of essentially U-shaped configuration with lip portions 428 and 430. The lip 430 is attached to a flange 432 of the rear door inner panel 378 which is connected to a flange 434 of an outer panel 436 of the rear door. A flange 438 of a reinforcement member 440 is interposed between the flange 432 and 434 of the rear door inner and outer panels 378 and 436. A garnish 442 is attached to the surface of the rear door inner panel 378 facing the vehicle compartment with resin fasteners 444. A window weatherstrip 446 is attached on the flanges 448, 450 and 452 of the inner and outer panels 378 and 436 and the reinforcement member 440. A windowpane 454 engages the window weatherstrip 446 in water-proofing fashion.

The lip 428 is adapted to contact the wall 398 of the front door weatherstrip 380 in water-proofing fashion in order to establish first inner water-proof seal therebetween. The front end of the flange 434 of the outer panel 436 is bent to form a contact surface 456. The contact surface 456 of the rear door outer panel 436 contacts the wall 398 of the front door weatherstrip 380 to establish a second outer weather-proof seal.

The weatherstrip 380 has an enlarged top section 458 longitudinally expanded and of essentially rectangular cup-shaped configuration with a water spout 460 at its floor. The top section 458 extends above the weatherstrip 366 with the water spout 460 beneath the drip seal 364. The top section 458 contacts the portion 372 of the weatherstrip 366 in water-proofing fashion. A lip 462 extends upwardly from the top of the outside vertical wall 464 of the top section 458. The lip 462 is adapted to contact the drip seal 364 in water-proofing fashion.

The weatherstrip 380 is formed with a recess 466 in the face opposing the front edge of the rear door 18. The recess 466 is adapted to engage a projection 468 protruding from an enlarged top section 470 of the weatherstrip 424 of the rear door 18.

As with the foregoing top section 458 of the weatherstrip 380 of the front door, the top section 470 of the rear door weatherstrip 424 defines a water spout 472. The water spout 472 communicates with the internal space of the substantially U-shaped major portion of the weatherstrip 424 via a passageway 474 formed through the top section. The axis of the passageway 474 for establishing communication between the water spout 472 and the top of the U-shaped section is oblique to the longitudinal axis of the weatherstrip 424.

The top section 316 is positioned beneath the drip seal 364 with water-proof contact provided by a lip 478 extending from the outer wall of the top section 470.

The top section 470 also establishes water-proof contact with the portion 372 of the weatherstrip 365.

The weatherstrip 380 and 424 cooperate so as to form two parallel sealing interfaces and simultaneously two parallel downspouts for possible leakage from the conventional vehicular rain gutter. The first sealing interface is the point of contact between the wall 398 of the front door weatherstrip 380 and the inboard lip 428 of the rear door weatherstrip 424. The second sealing interface is the point of contact between the wall 398 and the special contact surface 456 at the edge of the rear door outer panel 436.

The sealing structure set forth with reference to FIGS. 21 to 24 has been disclosed in further detail in the pending Japanese Patent Application No. 57-124192 and co-pending European Patent Application No. 83106836.6 corresponding to the foregoing Japanese Patent Application, the disclosure of which is hereby incorporated by reference for the disclosure purpose.

As set forth, the preferred embodiment of the vehicle body structure according to the present invention can provide a wider passenger compartment by application of a substantially flat floor assembly. Furthermore, the center-pillarless structure of the vehicle framework in which the rear edge of the front swinging door directly opposes the front edge of the rear sliding door provides a wider portal for entering and exiting the vehicle compartment. Furthermore, the door lock mechanisms provided for the front swinging door and the rear sliding door are designed to allow the center-pillarless frame work. Finally, sliding door support structures are utilized to reinforce the vehicle framework so that the vehicle body is sufficient strong even without the conventional center pillar.

What is claimed is:

1. A body structure of an automotive vehicle comprising:
   a vehicle body defining a single door opening on each of the two longer sides thereof:
   a floor assembly constituting part of said vehicle body, said floor assembly having an upper surface which constitutes a vehicle floor;
   a front swinging door hinged onto the front edge of the door opening and adapted to close the front moiety of said door opening; and
   a rear sliding door suspended from a guide rail for sliding movement between open and closed positions, said rear sliding door adapted to close the rear moiety of said door opening when in its closed position;
   wherein said floor assembly is supported by a lower frame work including side sills and a plurality of cross members, the lateral ends of the cross members being rigidly secured to said side sills and said guide rail is rigidly secured to the outer periphery of one of said side sills in such a manner that said guide rail can reinforce said one of said side sills to provide sufficient resistance to bending stresses applied to said one of said side sills; and
   wherein said rear sliding door is also suspended from another guide rail rigidly mounted on a roof side rail, this other guide rail being adapted to reinforce said roof side rail to provide sufficient resistance to bending stresses applied to the latter.

2. The body structure as set forth in claim 1, wherein said front swinging door is provided with a door lock mechanism which comprises:

an upper door lock mounted in an upper portion of a door and engageable with an upper striker which is secured to an upper portion of the body of the vehicle;

a lower door lock mounted in a lower portion of the door and engageable with a lower striker which is secured to a lower portion of the vehicle body;

a central operation assembly located in said door, said central operation assembly being operatively connected with the upper and lower door locks and operatively connected with an inside door handle and an outside door handle such that manipulating one of said inside door handle and said outside door handle in an unlatching direction releases the upper door lock and the lower door lock, said central operation assembly being further operatively connected with a key-operable lock cylinder and a locking knob such that operating one of the lock cylinder and the knob in a locking direction cancels the operative connection between the inside and outside handles and the upper and lower door locks.

3. A body structure of an automotive vehicle comprising:

a vehicle body having a framework including roof side rails and side sills extending laterally along the vehicle body, said vehicle body defining a single door opening on each lateral side;

a floor assembly forming a part of said vehicle body and having a floor surface, said floor assembly supported by said framework between said side sills on both of the lateral sides of the vehicle;

a front swinging door hinged onto the front edge of said door opening and adapted to close the front moiety of said door opening;

a rear sliding door adapted to close the rear moiety of said door opening;

a slider assembly mounted on said rear sliding door;

a rigid guide rail mounted on one of said side sills and engageable with said slider assembly of said rear sliding door for sliding movement of the latter, said guide rail adapted to reinforce said one of said side sills to provide sufficient resistance to bending stresses applied to said one of said side sills;

another slider assembly mounted on said rear sliding door; and another rigid guide rail mounted on said roof side rail, this other guide rail being engageable with said other slider assembly for guiding the movement thereof, said other guide rail being adapted to reinforce said roof side rail to provide sufficient resistance to bending stresses;

wherein said one of said side sills comprises inner and outer members defining a box-shaped cross-section, said side sill outer member defining a step on which said guide rail is fixedly mounted.

4. The body structure as set forth in claim 3, wherein said floor assembly supporting framework includes a plurality of cross-members extending laterally between said side sills on both lateral sides and supporting said floor assembly thereon.

5. The structure as set forth in claim 3, wherein said side sill inner member has a horizontal top surface adapted to support the lateral edge of said floor assembly.

6. The structure as set forth in claim 3, wherein each of said slider assemblies of said rear sliding door has means for pivotably securing said slider assembly to said rear sliding door, said pivoting means being adapted to cause pivotal movement of said slider assembly with respect to said rear sliding door in order to allow said rear sliding door to conform as nearly as possible to the contours of the exterior of the vehicle body when the sliding door is opened and closed.

7. The body structure as set forth in claim 3, wherein said front swinging door has upper and lower door locks connected to a central operation assembly, said upper and lower door locks being engageable with upper and lower strikers respectively and rigidly mounted on said roof side rail and said side sill respectively.

8. The body structure as set forth in claim 7, wherein said central operation assembly operatively connected to said upper and lower door locks is also operatively connected to an inside door handle and an outside door handle such that manipulating one of said inside door handle and said outside door handle in an unlatching direction releases the upper and lower door locks, said central operation assembly being further operatively connected with a key-operable lock device and a locking knob such that operating one of the lock device and the knob in a locking direction cancels the operative connection between the inside and outside door handles and the upper and lower door locks.

9. A body structure of an automotive vehicle comprising:

a vehicle body having a framework including roof side rails and side sills extending laterally along the vehicle body, said vehicle body defining a single door opening on each lateral side;

a floor assembly forming a part of said vehicle body and having a floor surface, said floor assembly supported by said framework between said side sills on both of the lateral sides of the vehicle;

a front swinging door hinged onto the front edge of said door opening and adapted to close the front moiety of said door opening;

a rear sliding door adapted to close the rear moiety of said door opening;

a slider assembly mounted on said rear sliding door;

a rigid guide rail mounted on one of said side sills and engageable with said slider assembly of said rear sliding door for sliding movement of the latter, said guide rail adapted to reinforce said one of said side sills to provide sufficient resistance to bending stresses applied to said one of said side sills;

another slider assembly mounted on said rear sliding door; and another rigid guide rail mounted on said roof side rail, said other guide rail being engageable with said first-mentioned slider assembly for guiding the movement thereof, said other guide rail being adapted to reinforce said roof side rail to provide sufficient resistance to bending stresses;

wherein said front swinging door has upper and lower door locks connected to a central operation assembly, said upper and lower door locks being engageable with upper and lower strikers respectively and rigidly mounted on said roof side rail and said one of said side sill respectively;

wherein said central operation assembly operatively connected to said upper and lower door locks is also operatively connected to an inside door handle and an outside door handle such that manipulating one of said inside door handle and said outside door handle in an unlatching direction releases the upper and lower door locks, said central operation assembly being further operatively connected with a key-operable lock device and a locking knob such that operating one of the lock device and the knob in a locking direction cancels the operative connection between the inside and outside door handles and the upper and lower door locks; and wherein said rear sliding door includes a door lock engageable with a striker mounted on a rear pillar of said vehicle body framework, said door lock is associated with a door lock operating assembly which is, in turn, operatively connected to an inside door handle and an outside door handle such that manipulating one of said inside door handle and said outside door handle in unlatching direction releases said door lock from said rear pillar striker.

10. The body structure as set forth in claim 9, wherein said door lock of said rear sliding door is associated with a child-safety lock for cancelling operative connection between said inside door handle and said rear door lock when it is in its locking position.

* * * * *